United States Patent [19]
Park

[11] Patent Number: 4,658,294
[45] Date of Patent: Apr. 14, 1987

[54] DIRECT MEMORY ACCESS CONTROL DEVICE FOR USE IN TELETEXT SIGNAL RECEIVING APPARATUS

[76] Inventor: Chong S. Park, 48-36 Shohaldong, Kwangmyung city, Kyungkeedo, Rep. of Korea

[21] Appl. No.: 813,717

[22] Filed: Dec. 27, 1985

[30] Foreign Application Priority Data

Dec. 31, 1984 [KR] Rep. of Korea ............... 14476/84

[51] Int. Cl.$^4$ ............................................. H04N 7/08
[52] U.S. Cl. .................................. 358/142; 358/148
[58] Field of Search ............... 358/147, 146, 142, 141, 358/148, 160, 12

[56] References Cited

U.S. PATENT DOCUMENTS 4,577,227 3/1986 Gurumurthy ..................... 358/147

OTHER PUBLICATIONS

"Wireless World Teletext Decoder 1-The Background", by Philip Darrington, Wireless World, vol. 81, No. 1479, pp. 498-504, 11/75.

Primary Examiner—Tommy P. Chin
Assistant Examiner—David E. Harvey
Attorney, Agent, or Firm—Birch, Stewart, Kolasch & Birch

[57] ABSTRACT

A direct memory access control device as a part of a teletext adaptor is equipped with a data separating element, a data receiving element including an improved direct memory access control device as a part, and a data processing element. The direct memory access control device comprises a serial/parallel convertor, a D-flip flop, an OR gate, a byte synchronization detector, a multivibrator, a 4 division counter, a 8 division counter, a 64 division counter, a RAM, a multiplexer and so forth. The teletext data can be stored in RAM. During an interval between the remaining video signal periods, the microprocessor can process signals so that all the elements may be simplified and the cost entailed therefore may be lowered accordingly.

1 Claim, 5 Drawing Figures

DIRECT MEMORY ACCESS CONTROL DEVICE FOR USE IN TELETEXT SIGNAL RECEIVING APPARATUS

BACKGROUND OF THE INVENTION

1. Field of the Invention

The present invention relates, in general, to a receiving device in the teletext adaptor and, in particular, to a direct memory access control device of the teletext signal receiving apparatus which is usable as a part of the teletext adaptor.

2. Description of the Prior Art

Generally, the teletext broadcasting system means a newest broadcasting system which uses an interval of vertical blanking signal of the already established television broadcasting signal to transmit the teletext data, such as information of a letter or diagram. Also, for receiving the teletext broadcasting signal, a special apparatus, such as teletext adaptor, is required.

The teletext adaptor can be used by being connected with the ordinary television receiver. It is composed of a data separating device, a data receiving device and a data processing device. The data separating device separates the teletext data compounded within a vertical blanking interval of the composite video signal and supplies it to the data receiving device. A 36 byte signal corresponding to a data line is obtained during one interval of vertical blanking signal. The data line includes 3 synchronizing bytes and a control data. The control data is used for the transmission of teletext information. It consists of an error-preventing bit and address bits of information, etc.

The data receiving device divides real teletext data necessary for the data processing device. The data processing device reads such teletext data and supplies video composite signals for display on the screen of television receiver. However, the prior teletext adaptor requires to use a central processing unit to access memory for teletext information and it should have a large capacity which will, in turn, cause delay in data processing speed. Also, there are other shortcomings including high manufacturing cost and low reliability.

Therefore, it is an object of the present invention to provide a direct memory access control device to economize the manufacturing cost thereof.

Further, it is an object of the present invention to provide a direct memory access control device usable as a part of the highly reliable teletext adaptor.

Also, it is an object of the present invention to provide a direct memory access control device for teletext signal receiving apparatus usable as a part of the teletext adaptor.

SUMMARY OF THE INVENTION

The present invention relates to a direct memory access control device for teletext signal receiving apparatus usable as a part of the teletext adaptor. The invention includes a direct memory access control device, in which the teletext data is converted into the parallel data of 8 bit and this 8 bit parallel data is temporarily stored, a microprocessor, a buffer memory and so forth.

The present invention may be used as a part of the teletext adaptor. Thus, the memory of teletext adaptor can be directly accessed and controlled.

Other detailed features and advantages of the present invention will become apparent from the accompanying drawings taken in conjunction with the detailed description of the presently preferred embodiment of the invention.

DETAILED DESCRIPTION OF THE INVENTION

Figure 1:
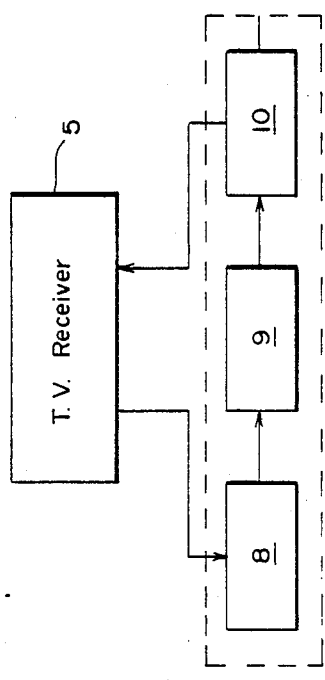
FIG. 1 shows a circuit of the teletext adaptor.
Figure 2:
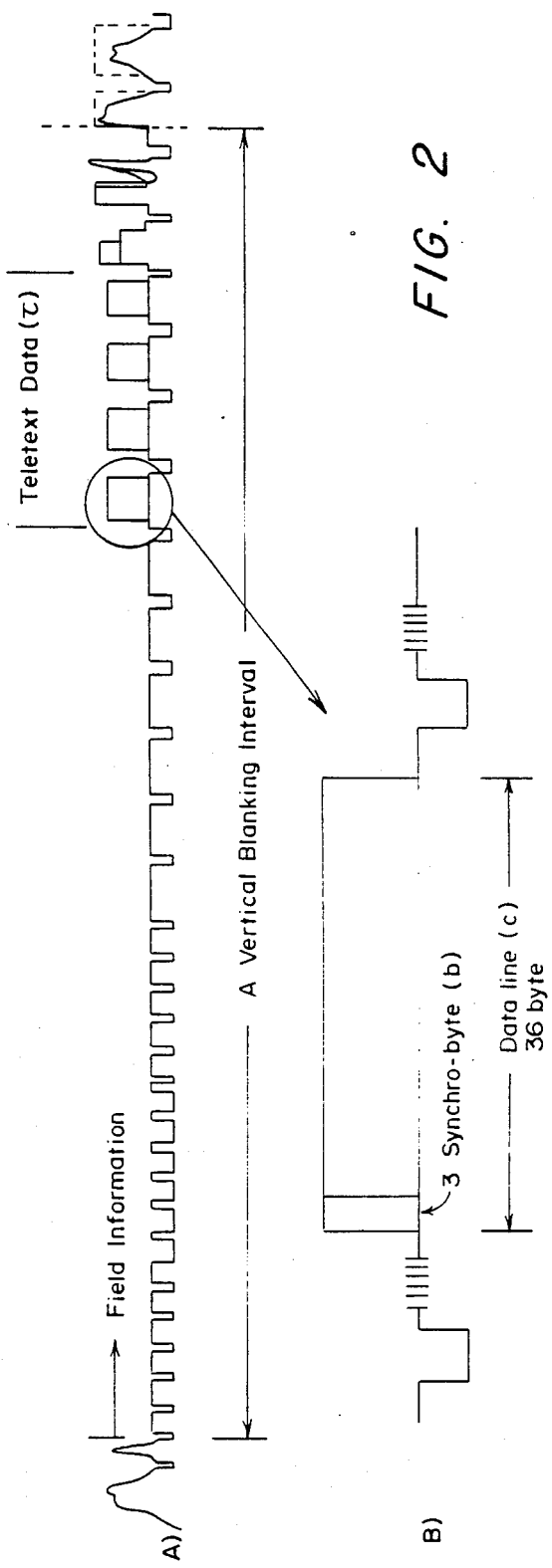
FIG. 2 depicts the waveforms of television composite signal comprising the teletext signals.

The teletext adaptor as shown in FIG. 1 can be used by connecting it to the existing television receiver. It is composed of a data separating element(8), a data receiving element(9) and a data processing element(10). As the composite signal inputted to the data separating element(8) forms a wave pattern as shown in FIG. 2, the data separating element(8) separates the teletext data compounded within a vertical blanking interval of the composite video signal and supplies it to the data receiving element. In other words, four 36 byte signals each of which corresponds to a data line(c) as shown in FIG. 2B are obtained during one vertical blanking interval. As to the data line, it includes three synchronizing bytes and a control data, etc. The control data, which is used for the effective transmission of teletext information, is composed of an error-preventing bit and address bits of information, etc.

The data receiving element(9) separates real teletext data necessary for the data processing element(10).

The data processing element(10) reads such teletext data according to the fixed specifications and turns it into the composite video signals for display on the TV receiver.

The present invention aims to provide a direct memory access control device to curtail the production cost of data receiving element and to improve its reliability. When an explanation is given to its structure and operation, referring to the attached drawings, it is as follows:

Connect the output of serial/parallel converter(16) to the input of byte synchronization detector(17) and flip-flop(20). Connect the output of byte synchronization detector(17) to the input on the other side of OR gate (18') through the input on one side of OR gate(18') and the mono-stable multivibrator(18). Connect the output of OR gate(18') to the clock input(CK) of 4 division counter (19) and then connect it to the terminal (MR) of 64 division counter(22) and to the terminal(SR) of 8 division counter(21). Connect the output(Q) of flip-flop(20) to the input(D) of RAM(24). Connect the output(Q$_2$) of 8 division counter(21) to the input on one side of OR gate through converter(21') and NAND gate(22') and the counter signal($\overline{VBI}$) during a vertical blanking interval to the input on the other side of OR gate(24) and connect the output of OR gate(24') to the terminal($\overline{W}$) of RAM(24).

Figure 5:
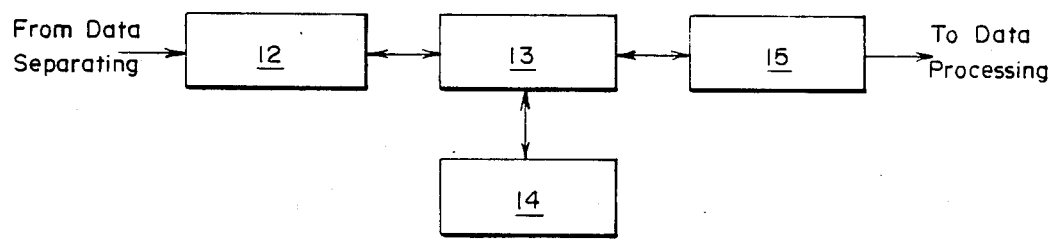
FIG. 5 is a block diagram of an embodiment under the present invention.

Regarding FIG. 5, it aims to give an outline of the present invention. The control signals, such as a serial data, a clock signal, etc, obtained from the data separating element(8) in FIG. 1 are supplied to the direct access control element(12), where the teletext data transmitted during an interval of the vertical blanking signal is converted into an 8 bit parallel data and stored in memory.

The data temporarily stored in memory is read by the microprocessor(13) during an interval of the video signal subtracted from one field interval of the television signal by an interval of the vertical blanking signal and processed by it as per teletext standards and then stored in buffer memory(14). In the buffer memory(14), a data for one picture plane of the teletext selected by the user(teletext information provided with the same data group address) is stored and transmitted to the data processing element through input/output apparatus(15).

Figure 3:
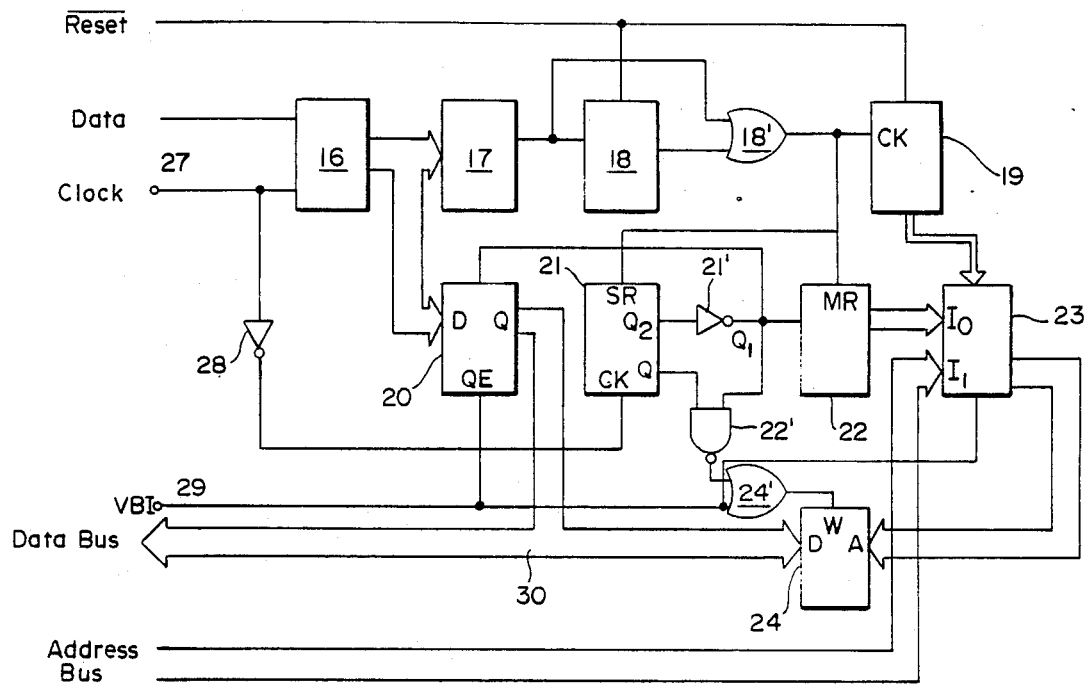
FIG. 3 shows a circuit of a direct memory access control device for teletext signal receiving apparatus under the present invention.

The present invention provides the direct memory access controller(12) as shown in FIG. 3, which can be used as a part of the data receiving device as shown in FIG. 5. In the data separating element(8), a serial data(26), a clock signal(CK:27) indicating each bit of this serial data, a signal of $\overline{VBI}$(29) indicating a vertical blanking interval(1) and a reset signal($\overline{RESET}$:25) are supplied to the direct memory access controller(12). The phase and format of these signals are respectively shown in FIG. 4A–4D.

The serial data(26) and the clock signal(CK:27) applied to the serial/parallel converter(16) are converted into an 8 bit parallel data. The 8 bit parallel signal will have a byte synchronizing signal when applied to the byte synchronization detector(17). This byte synchronizing signal, which is outputted once during each horizontal synchronizing interval of the teletext data(2) is outputted four times during a vertical blanking interval(1). The byte synchronizing signal is designed to have an order of 11100111 in case it uses the North America Basic Teletext System.

The waveform outputted by the byte synchronizing detector (17) is shown in FIG. 4E.

A portion indicated by a dotted line in FIG. 4E is an output of the byte synchronizing detector(17) estimated in consideration of the 11100111 which may exist in the actual data after a byte synchronizing signal. The estimated portion is deleted by passing the output of byte synchronizing detector through multivibrator(18) and OR gate(18').

Figure 4:
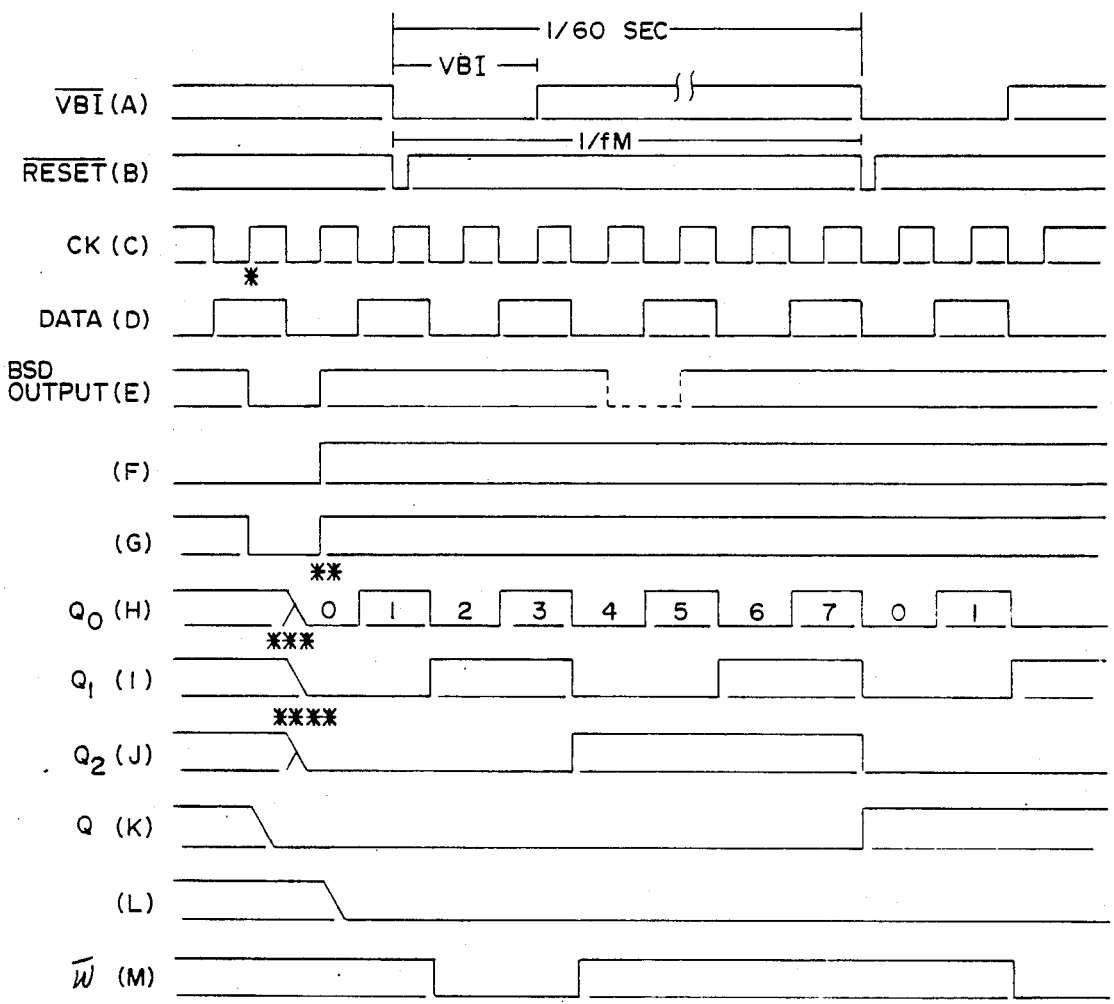
FIG. 4 depicts the waveforms of each point of the circuit shown in FIG. 3.

The moment the byte synchronization is detected(indicated by * in FIG. 4C), the reset signal ($\overline{RESET}$:25) as shown in FIG. 4B is applied to the output of mono-stable multivibrator(18) and to the input (CLR) of 4 division counter (19) in order to satisfy the phase relations as shown in FIG. 4. This is to enable the mono-stable multivibrator (18) to have the output of logic "0" and the 4 division counter(19) to have the output of logic "1" before the byte synchronization is detected.

Thus, the output of byte synchronization detector passing through multivibrator(18) and OR gate(18') is supplied respectively to the input(CK) of 4 division counter(19) and to the reset input(SR and MR) of 8 division counter(21) and 64 division counter(22).

Consequently, the 4 division counter(19) counts upward at the rising edge(indicated by ** in FIG. 4G) of the output signal of byte synchronizing detector which passed through the OR gate(18') and FIG. 4L shows the output(Q) of 4 division counter.

On the other hand, as the 8 division counter(21) is synchro-reset, its output is reset to logic "0" as soon as the clock signal(CK) presents a falling edge(indicated by *** in FIG. 4H) when the terminal(SR) has logic "0".

As to 64 division counter(22), it operates as a mono-synchro-reset and its output(Q) is reset to logic "0" when the terminal(MR) becomes logic "0"(indicated by **** in FIG. 4J).

The 8 division counter(21) continues to count upward according to the output of invertor(28). When it counts completely, it stores 8 bit data in D-flip flop(20) through its output(Q2).

Referring again to 64 division counter(22), it counts upward once every time the 8 division counter(21) counts completely so that it may act with the output of 4 division counter(19) as an address of RAM(24) through multiplexer (23). In other words, the 4 division counter(19) effects an increase in address once during each input synchronizing interval of the teletext data and the 64 division counter (22) effects an increase in address for every data transmission period of 1 byte during a horizontal synchronizing interval.

The input of multiplexer(23) selects either the address 10 or the address 11. As it is connected to the terminal ($\overline{VBI}$:29), the output of 4 division counter(19) and 64 division counter(22) acts as the address of RAM(24) for direct memory access during an interval of the $\overline{VBI}$ signal. During the remaining interval of video signal, the address bus(31) of microprocessor(13) is connected to the input of multiplexer(23) for reading as per instructions.

On the other hand, the input(W) signal of RAM(24) is supplied with a write instruction as shown in FIG. 4M. When the $\overline{VBI}$ signal is logic "0", RAM(24) effects a writing operation. And when the $\overline{VBI}$ signal(29) is logic "1", RAM (24) effects a reading operation to process the signals in the microprocessor(13).

As to the signal (W) of RAM(24) as shown in FIG. 4M, a point of time it becomes logic "0" is after the period of two clock signals(27) when the 8 division counter (21) has counted completely and the 64 division counter(22) has set the address of RAM(24). So, one realizes that the address and data of RAM(24) is so stabilized as to write without trouble. Thus, RAM(24) is placed in a stabilized writing position.

On the other hand, the input of flip flop(20) is connected to $\overline{VBI}$ signal(29). During an interval of the $\overline{VBI}$ signal, the teletext data is stored in RAM(24) by the operation of flip flop(20). The flip flop(20) is released from the data bus(30) as tri-status during an interval of video signal.

The direct memory access control device can be embodied by the use of commercial integrated circuits.

As described hereinabove, the present invention aims to simplify the apparatus, curtail its manufacturing cost and improve the reliability thereof by storing the teletext data(2) in memory and processing the signals with a microprocessor(13) during the remaining video signal interval.

While the present invention is described in some detail, it will be apparent to those skilled in the art that various changes and modifications can be made without departing from the spirit of the invention.

Therefore, the invention should not be limited by the description made above but only by the claims which follow.

What is claimed is:

1. In a teletext adaptor comprising a data separating element, a data receiving element including an improved direct memory access control device as a part and a data processing element, the improved direct memory access control device comprising;

a serial/parallel converter having an output connected to an input of a byte synchronization detector and a D-input of a flip flop;

a first OR gate having an input connected to an output of the byte synchronization detector, another input connected to an output of a multivibrator which is supplied with the output of the byte synchronization detector, and an output connected to a clock input of a 4 division counter, an input of a 64 division counter and a terminal of an 8 division counter;

a RAM having an input connected to an output of the flip flop and to a data bus; and a second OR gate having an input connected to an output of a NAND gate, another input connected to receive a vertical blanking internal signal, and and output connected to a terminal of the RAM which also receives an address input from a multiplexer.

* * * * *